United States Patent
Jones et al.

(10) Patent No.: US 12,020,198 B2
(45) Date of Patent: Jun. 25, 2024

(54) INTELLIGENT COLLECTION BOX

(71) Applicant: United States Postal Service, Washington, DC (US)

(72) Inventors: Anthony Cramer Jones, Brooklyn, NY (US); Dominic Heinrich, New York, NY (US); Caspar Serge Ouvaroff, New York, NY (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 181 days.

(21) Appl. No.: 15/850,432

(22) Filed: Dec. 21, 2017

(65) Prior Publication Data

US 2019/0197462 A1    Jun. 27, 2019

(51) Int. Cl.
*G06Q 10/083* (2023.01)
*A47G 29/122* (2006.01)
(Continued)

(52) U.S. Cl.
CPC ....... *G06Q 10/083* (2013.01); *A47G 29/1225* (2013.01); *A47G 29/124* (2013.01);
(Continued)

(58) Field of Classification Search
CPC .. G06Q 10/083; G06Q 30/0283; G06N 20/00; G06N 3/006; A47G 29/1225;
(Continued)

(56) References Cited

U.S. PATENT DOCUMENTS

| 6,788,203 B1 * | 9/2004 | Roxbury | G08B 13/08 232/35 |
| 7,240,036 B1 * | 7/2007 | Mamdani | G06Q 20/04 705/75 |

(Continued)

FOREIGN PATENT DOCUMENTS

| CN | 205433230 U | * | 8/2016 |
| JP | 2004083148 A | * | 3/2004 |

OTHER PUBLICATIONS

KMJ, Red Shipping container of Lorenzo Shipping Corporation, https://en.wikipedia.org/wiki/Intermodal_container#/media/File:Container_01_KMJ.jpg, Jul. 19, 2004, pp. 1-2. (Year: 2004).*

(Continued)

*Primary Examiner* — Omar Zeroual
*Assistant Examiner* — Duane N. Moore
(74) *Attorney, Agent, or Firm* — MH2 TECHNOLOGY LAW GROUP, LLP

(57) ABSTRACT

Systems and methods for an intelligent collection box are provided. Implementations of the intelligent collection box include a processor, a computer-readable data storage system storing program instructions, a weighing scale, a display, a speaker, a microphone, a network interface, and a power generator. The program instructions, when executed by the processor, cause the intelligent collection box to perform operations including identifying keywords spoken by the user. The operations also include authenticating the user using the keywords. The operations also include determining a request for delivery of an item based on the (Continued)

keywords. The operations also include responding to the request for delivery. The operations also include determining a weight of the item. The operations also include determining delivery options for the item using the weight and using delivery information. The operations also include determining that the item has been received by the collection box.

20 Claims, 7 Drawing Sheets

(51) Int. Cl.
| | |
|---|---|
| A47G 29/124 | (2006.01) |
| G06F 21/32 | (2013.01) |
| G06F 40/263 | (2020.01) |
| G06F 40/58 | (2020.01) |
| G06N 3/006 | (2023.01) |
| G06N 20/00 | (2019.01) |
| G06Q 30/0283 | (2023.01) |
| G07B 17/00 | (2006.01) |
| G10L 15/08 | (2006.01) |
| G10L 15/22 | (2006.01) |
| G10L 17/00 | (2013.01) |
| H04R 1/02 | (2006.01) |
| A47G 29/12 | (2006.01) |
| A47G 29/30 | (2006.01) |

(52) U.S. Cl.
CPC ............ *G06F 21/32* (2013.01); *G06F 40/263* (2020.01); *G06F 40/58* (2020.01); *G06N 3/006* (2013.01); *G06N 20/00* (2019.01); *G06Q 30/0283* (2013.01); *G07B 17/00* (2013.01); *G10L 15/08* (2013.01); *G10L 15/22* (2013.01); *G10L 17/00* (2013.01); *H04R 1/028* (2013.01); *A47G 29/1207* (2013.01); *A47G 2029/1226* (2013.01); *A47G 2029/1228* (2013.01); *A47G 29/30* (2013.01); *G10L 2015/088* (2013.01); *G10L 2015/223* (2013.01)

(58) Field of Classification Search
CPC .. A47G 29/124; A47G 29/1207; A47G 29/30; A47G 2029/1226; A47G 2029/1228; G06F 17/275; G06F 17/289; G06F 21/32; G06F 40/58; G07B 17/00; G10L 15/08; G10L 15/22; G10L 17/005; G10L 2015/088; G10L 2015/223; G10L 17/00; H04R 1/028

See application file for complete search history.

(56) References Cited

U.S. PATENT DOCUMENTS

| | | | |
|---|---|---|---|
| 9,299,053 B2 | 3/2016 | Gazdzinski et al. | |
| 9,471,559 B2* | 10/2016 | Castelli | G06F 17/2715 |
| 9,805,329 B1 | 10/2017 | Biswas | |
| 2002/0032573 A1 | 3/2002 | Williams et al. | |
| 2002/0165729 A1 | 11/2002 | Kuebert et al. | |
| 2003/0182155 A1* | 9/2003 | Nitzan | G06Q 10/0832 705/332 |
| 2004/0064326 A1* | 4/2004 | Vaghi | G06Q 10/08 705/401 |
| 2006/0028398 A1* | 2/2006 | Willmore | G06F 3/14 345/2.3 |
| 2006/0208066 A1* | 9/2006 | Finn | H04H 60/74 235/441 |
| 2013/0198300 A1 | 8/2013 | Briggman et al. | |
| 2013/0218721 A1* | 8/2013 | Borhan | G06Q 20/322 705/26.41 |
| 2014/0136013 A1* | 5/2014 | Wolverton | B60K 37/06 701/1 |
| 2014/0244536 A1 | 8/2014 | Far-Hadian | |
| 2015/0371468 A1* | 12/2015 | Mackin | G06Q 10/0836 340/5.26 |
| 2016/0042320 A1 | 2/2016 | Dearing et al. | |
| 2016/0049152 A1* | 2/2016 | Kennewick | G10L 15/18 704/257 |
| 2016/0072915 A1* | 3/2016 | Decanne | G06F 3/147 715/728 |
| 2016/0300187 A1* | 10/2016 | Kashi | G06Q 10/0836 |
| 2017/0061372 A1 | 3/2017 | Agarwal | |
| 2017/0132565 A1 | 5/2017 | Beadles et al. | |
| 2017/0228367 A1* | 8/2017 | Pasupalak | G06F 40/40 |
| 2017/0323371 A1* | 11/2017 | Lampert | G06Q 30/0623 |
| 2017/0352122 A1* | 12/2017 | Markarian | A47G 29/1201 |
| 2017/0357937 A1 | 12/2017 | Edens et al. | |
| 2018/0060829 A1 | 3/2018 | Gillen | |
| 2019/0033856 A1* | 1/2019 | Ferguson | G06Q 10/08355 |
| 2019/0197649 A1 | 6/2019 | Jones et al. | |
| 2022/0284388 A1 | 9/2022 | Jones et al. | |
| 2023/0252398 A1 | 8/2023 | Jones et al. | |

OTHER PUBLICATIONS

Walsh, E.K., Non-Final Office Action issued in U.S. Appl. No. 15/850,914 dated Oct. 21, 2019, pp. 1-41.
U.S. Office Action issued in corresponding U.S. Appl. No. 15/850,914 dated May 20, 2020, 44 pages.
U.S. Office Action issued in U.S. Appl. No. 15/850,914 dated Oct. 23, 2020, 28 pages.
U.S. Office Action issued in U.S. Appl. No. 15/850,914 dated Mar. 9, 2021, 16 pages.
U.S. Office Action issued in U.S. Appl. No. 15/850,914 dated Jan. 31, 2020, 40 pages.
U.S. Office Action issued in U.S. Appl. No. 15/850,914 dated Sep. 20, 2021, 12 pages.
Notice of Allowance issued in U.S. Appl. No. 15/850,914 dated Jan. 28, 2022, 12 pages.
Cullen et al., "Reading Encrypted Postal Indicia", Proceedings of 3rd International Conference on Document Analysis and Recognition (Year: 1996), pp. 1018-1023.
Corrected Notice of Allowability issued in U.S. Appl. No. 15/850,914 dated Feb. 9, 2022, 3 pages.
Walsh, E.K. (Examiner), US Office Action issued in U.S. Appl. No. 18/296,017 on Oct. 13, 2023, 60 pages.

* cited by examiner

INTELLIGENT COLLECTION BOX

BACKGROUND

A collection box (a.k.a., blue box, postbox, mailbox, letter box, or drop box) is a physical box into which outgoing mail items (e.g., letters, postcards, and small packages) can be deposited for collection and delivery by the United States Postal Service (USPS) or other such delivery or courier services. However, sending mail or having an item delivered by a delivery or courier service is not as simple as dropping the item in a collection box. For example, after locating the collection box, an individual may discover a need for additional information that will assist them in mailing or sending their letter, package, or other item. For instance, the individual may discover that the collection time has passed and may need collection-time information for another collection box. Also, the individual may be unsure that the item has the correct delivery fee (e.g., postage) or address information and may want to verify the delivery fee or address information. Further, the individual may discover that the item is too large for the collection box and may need information regarding a delivery service location (e.g., a post office) that can accept the large item. To avoid the item being delayed and/or returned by the delivery service, the customer may attempt to find another collection box or travel to a post office. In such cases, the individual may wish to know the location of the other collection box or the post office. Also, the individual may wish to know the collection hours of the other collection box or the operating hours of the post office. Further, the individual may wish to know whether foul weather is predicted, which may impact their trip to the other collection box or the post office. Accordingly, it is desirable to provide a collection box for delivery items that solves some or all of the problems associated with current drop boxes.

SUMMARY

Systems and methods for an intelligent collection box are provided. Implementations consistent with the present disclosure provide an intelligent collection box mountable onto a collection box. The intelligent collection box can include a processor, a computer-readable data storage system storing program instructions, a weighing scale, a display, a speaker, a microphone, a network interface, and a power generator. The program instructions, when executed by the processor, cause the intelligent collection box to perform operations including identifying keywords spoken by the user. The operations also include authenticating the user using the keywords. The operations also include determining a request for delivery of an item based on the keywords. The operations also include responding to the request for delivery. The operations also include determining a weight of the item. The operations also include determining delivery options for the item using the weight and using delivery information. The operations also include determining that the item has been received by the collection box.

Additionally, implementations consistent with the present disclosure provide a collection box system for delivery items. The collection box system includes a collection box and an intelligent collection box. The intelligent collection box includes a processor, a computer-readable data storage device that stores program instructions, a speaker, a microphone, and a network interface. The program instructions, when executed by the processor, cause the intelligent collection box to perform operations including detecting a user. The operations also include identifying keywords spoken by the user. The operations also include determining a request related to item delivery based on the keywords. The operations also include presenting, to the user, a response to the request. The operations also include interactively repeating the identifying, determining, and presenting.

Additionally, implementations consistent with the present disclosure provide a method including detecting, by an intelligent collection box, a user. The method also includes identifying, by the intelligent collection box, keywords spoken by the user. The method also includes determining, by the intelligent collection box, a request related to item delivery based on the keywords. The method also includes presenting to the user, by the intelligent collection box, a response to the request. The method also includes interactively repeating, by the intelligent collection box, the identifying, the determining, and the presenting.

DRAWINGS

The present invention will become more fully understood from the detailed description and the accompanying drawings, wherein.

DETAILED DESCRIPTION

Figure 1:
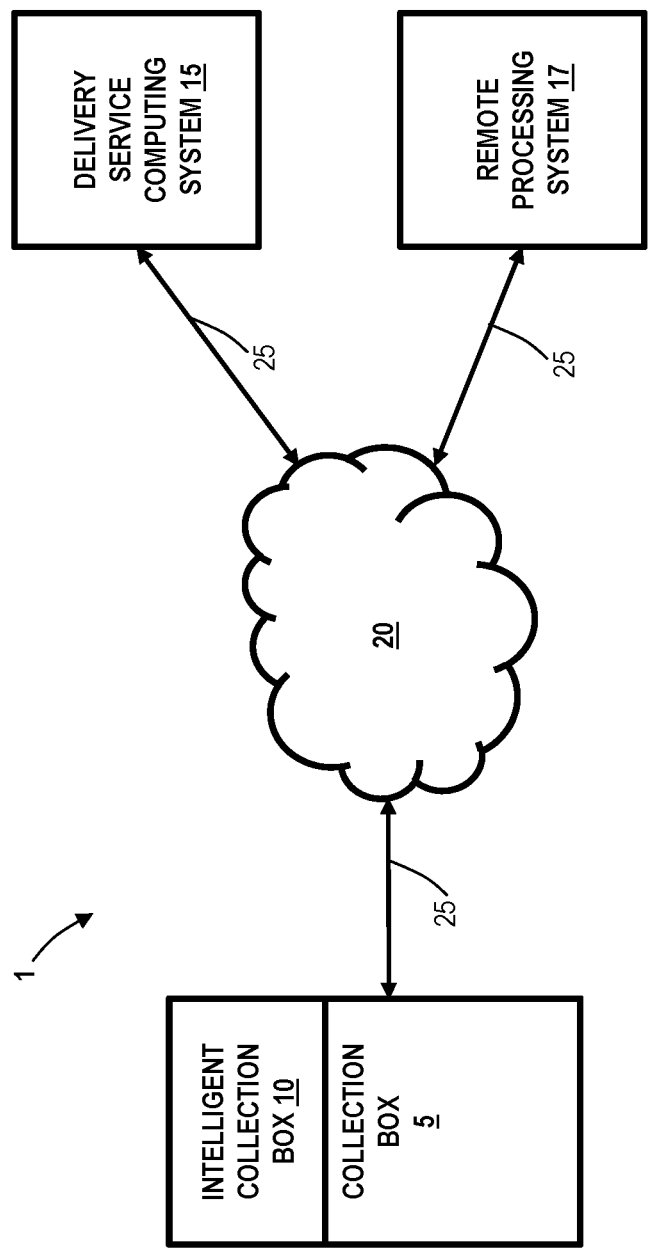
FIG. 1 shows a system block diagram illustrating an example of an environment for implementing systems and processes in accordance with aspects of the present disclosure.

The present disclosure relates to automatic transaction machines. More specifically, the present disclosure relates to intelligent collection boxes. In accordance with aspects of the present disclosure, an intelligent collection box can automatically detect an individual in its vicinity and intelligently interact with the individual. Using artificial intelligence, the collection box can conversationally respond to user queries. For example, the intelligent collection box may continuously listen for certain combinations of spoken keywords and, in response, initiate a conversation with the individual to provide assistance or information. For example, by simply stating "Hello Box," the individual can trigger an interaction with an intelligent collection box. After starting the interaction, the intelligent collection box can answer questions related to delivery services (e.g., postal services), for example, delivery fee, pick up times, estimated delivery time, and the location of the closest post office, estimated wait-time at the post office. Also, the intelligent collection box may answer complex questions, such as "how do I apply for a passport?" or "how do I hold my mail?" The responses provided by the intelligent collection box may be context-aware (e.g., based on time, location, previous inputs from the user). In addition to answering questions, some implementations of the intelligent collection box can provide item delivery services. For example, various embodiments may deliver a delivery fee code that can be written onto an item in lieu of a delivery fee stamp. As another example, various embodiments of the intelligent collection box may provide forms or documents (e.g., a hold mail request form) to the user via a smartphone or other user device.

Advantageously, various intelligent collection boxes consistent with this disclosure enable individuals to obtain delivery information and services at any time of the day without traveling to a retail location of the delivery service (e.g. a post office location). Also, some implementations allow users to interact with the intelligent collection boxes using only their voice (i.e., entirely hands-free).

Additionally, in some implementations, various intelligent collection boxes consistent with this disclosure can include an electrical power-generation system, such as a solar generator. The intelligent collection box can also include a video display and lights (e.g., light-emitting diodes) that provide visual feedback to users during an interaction.

Moreover, in some implementations, various intelligent collection boxes consistent with this disclosure can be produced by retrofitting existing collection boxes and can operate without any external power source. For example, retrofittable intelligent collection boxes can have a weather-resistant and damage-resistant enclosure shaped to securely mount on existing collection boxes.

Further, in some implementations, the above-described functionality of the intelligent collection box can be provided by self-service kiosks at retail locations or by home computing devices (e.g., using personal computers or smart home devices). The functionality of the intelligent collection box can also be provided through online services. For example, an intelligent collection box can interact with individuals via social media platforms and Internet messaging services.

Reference will now be made in detail to specific implementations illustrated in the accompanying drawings and figures. In the following detailed description, numerous specific details are set forth to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a system block diagram illustrating an example of an environment 1 for implementing systems and processes in accordance with aspects of the present disclosure. The environment 1 can include one or more collection boxes 5, one or more intelligent collection boxes 10, one or more delivery service computing systems 15, one or more remote processing systems 17, a network 20, and one or more communication links 25. The one or more intelligent collection boxes 10, the one or more delivery service computing systems 15, and the one or more remote processing systems 17 can be communicatively linked to each other via the network 20 and the one or more communication links 25.

In some implementations, the collection box 5 can be a conventional collection box, such as a well-known street-corner USPS "blue box" upon which the intelligent collection box 10 can be retrofitted or attached. In other implementations, the collection box 5 can be a retail kiosk incorporating the functionality of the intelligent collection box 10. As detailed below, the intelligent collection box 10 can be computerized device or subsystem that intelligently interacts with individuals to provide delivery service-related information and services and the like. While illustrated as a physical system mounted to an collection box 5 in FIG. 1, it is understood that other implementations of the intelligent collection box 10 can be implemented as an online system (e.g., cloud-based) without a collection box 5.

The delivery service computing system 15 can be one or more computing devices that provide information and services to the intelligent collection box 10. In implementations, the delivery service computing system 15 can provide information such as collection times, post office operating hours, post-office wait times, and the like. For example, the delivery service computing system 15 can maintain one or more searchable database of delivery service information and related information. The delivery service computing system 15 may receive requests for information or queries from the intelligent collection box 10, and in reaction, search the database and provide query responses. In some embodiments, the searchable database may be or include look-up tables that associate predefined responses with corresponding predefined queries. Additionally, the delivery service computing system 15 can provide services to the intelligent collection box 10, such as services for user authentication and for selling digital stamps (e.g., STAMPS.COM™ operated by the USPS). In some implementations, the services can include a "digital stamp" service, as described in copending U.S. Patent Application Ser. No. 15/850,914 titled "Digital Stamps," filed Dec. 21, 2017, which is incorporated herein by reference in its entirety.

The remote processing system 17 can be one or more computing systems that provide services to the intelligent collection box 10. The services can include content storage and management services, location and mapping services, weather services, natural language processing services, language translation services, voice transcription services, and the like. Such services can be provided to the intelligent collection box 10 by one or more providers using, e.g., a software-as-a-service ("SAAS") model, and accessed via application program interfaces (APIs) accessed and interfaced with by the intelligent collection box 10. While these services are illustrated as being provided from the remote processing system 17 in the example of FIG. 1, in other implementations some or all of the program instructions for such services can be stored locally and executed natively by the intelligent collection box 10.

The network 20 can be any type of communications network through which the intelligent collection box 10 and the delivery service computing system 15 can communicate using one or more communication links 25. The communications network 20 can be, for example, the Internet, a wide area network, a local area network, a cellular network, or a peer-to-peer network or any combination thereof. The communication links 25 can be any wired or wireless communication channel or combination thereof. In implementations, the communication network 20 and/or the communication links 25 can provide secure communications channels between the intelligent collection box 10 and the delivery service computing system 15, for example, to protect personal and financial information. While delivery service computing system 15 and remote processing system 17 are illustrated as two separate systems, it is understood that the functionality of these systems can be implemented in a single system, which can be operated by a single entity, or divided among more than two systems, which can be operated by multiple entities.

Figure 2:
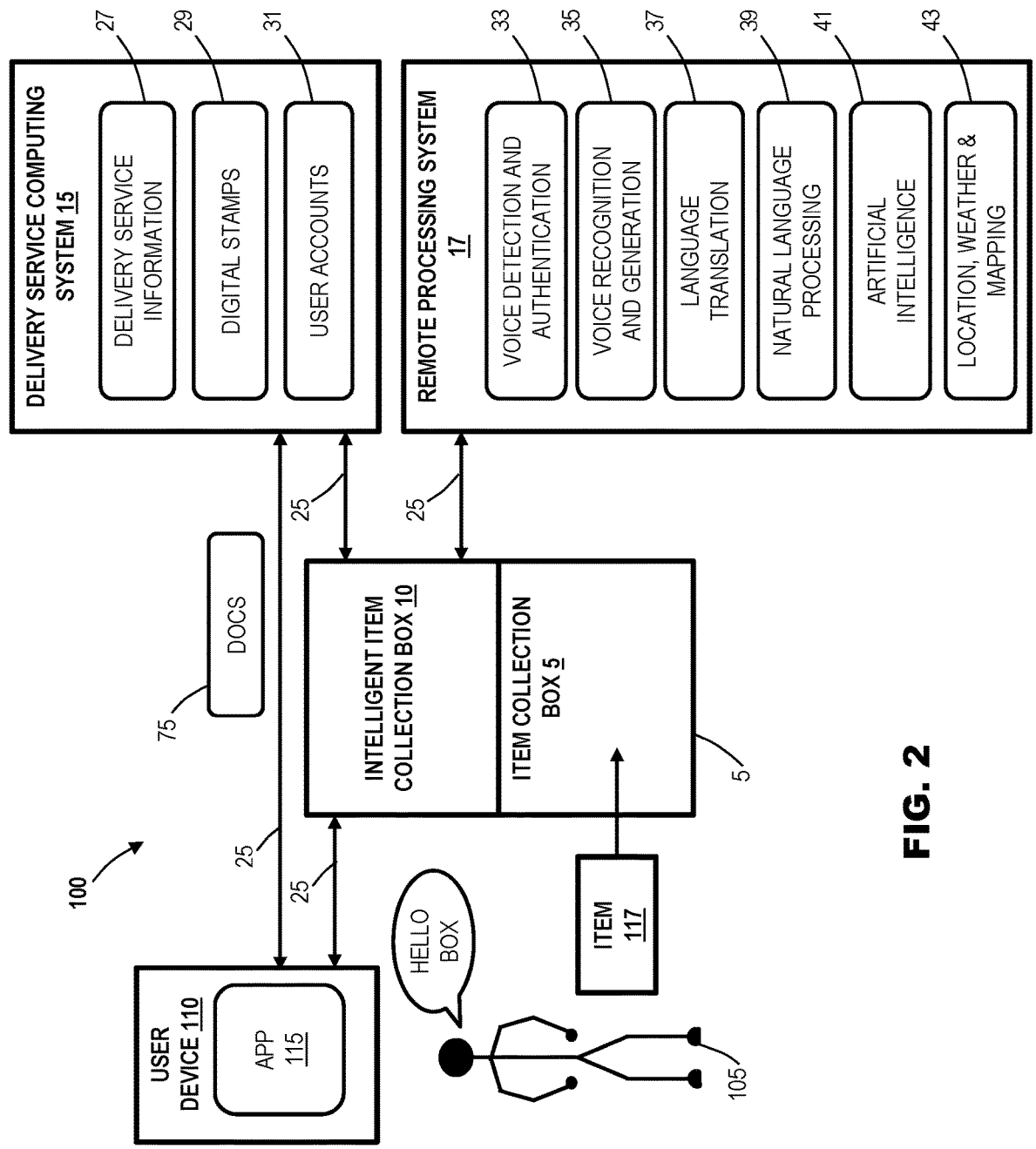
FIG. 2 shows a functional block diagram illustrating an example of a system in accordance with aspects of the present disclosure.

FIG. 2 shows a functional block diagram illustrating an example of a system 100 in accordance with aspects of the present disclosure. The system 100 can include a collection box 5, an intelligent collection box 10, a delivery service computing system 15, and a remote processing system 17, all of which can be the same or similar to those described above. Additionally, the system 100 can include a user device 110 of a user 105. The user 105 can be an individual that interacts with the intelligent collection box 10 to obtain, for example, delivery service information and services. The user 105 can directly interact with the intelligent collection box 10 or indirectly interact with the intelligent collection box 10 via the user device 110 (e.g., using voice recognition, a touchscreen, a keyboard, and/or a pointer device of the user device 110).

The user device 110 can be a computing system or smart device of the user that can communicatively connect (directly or indirectly) to the intelligent collection box 10 and/or the delivery service computing system 15 via one or more wired and/or wireless communication links 25, which can be the same or similar to those previously described. For example, in situations where the user device 110 is a mobile device (e.g., a smartphone), the user device 110 can communicate with the intelligent item box 10 via a wireless connection (e.g., a BLUETOOTH® and/or Long-Term Evolution (LTE)) wireless data link). In various implementations, the user device 110 can be a smart phone, a personal computer system, a set top box, a laptop device, a tablet device, or other programmable user electronic device. In some implementations, the user device 110 can execute an application 115, which provides an interface (e.g., a graphic user interface) through which the user 105 can exchange information with the intelligent collection box 10 and the delivery service computing system 15. The information can include, for example, text (e.g. keyboard inputs, login information, and documents) and information convertible into text (e.g., spoken words, hand gestures, and images). The application 115 can also provide other services available through the user device 110, such as authentication (e.g., biometric), secure payment (e.g., credit card information), addresses (e.g., contact list), and location (e.g., mapping).

In accordance with aspects of the present disclosure, the intelligent collection box 10 can use sensors (e.g., proximity, motion, and/or acoustic sensors) to detect whether the user 105 is within a predefined distance (e.g., about one yard). Additionally, the intelligent collection box 10 may "listen" to detect utterances of particular keywords (e.g., using a microphone) and interact with the user 105 in response. Thus, in some situations, the user 105 may simply drop off an item 117 (e.g., a box, package, envelope, letter, postcard, etc.) in the collection box 5 without triggering an interaction with the intelligent collection box 10. While in other situations, the user 105 can approach the intelligent collection box 10 and utter keywords, such as "Hello Box," in order to begin an interactive session with the intelligent collection box 10. After detecting the user and/or the keywords, the intelligent collection box 10 can initiate an interactive chat with the user 105. The intelligent collection box 10 can respond to the user's 105 keywords by acknowledging the user and offering assistance by saying, for example, "Hello. How can Box help you?" or the like. The user 105 can then interact with the intelligent collection box 10 by asking it almost any delivery service-related question, using for example, voice recognition, user-input devices on the intelligent collection box 10, and or the user device 110.

After initiating the interactive chat with the user 105, the intelligent collection box 10 can respond to a user's 105 question, request, or query using information and software services provided by the delivery service computing system 15 and/or the information processing systems 17. In various implementations, the delivery service computing system 15 can provide (e.g., transmit to) the intelligent collection box 10 with requested delivery service-related information and services, including delivery service information 27, digital stamp services 29, and user account services 31. The delivery service information 27 may provide requested information, such as collection box locations, collection times, post office locations, post office operating hours, post-office wait times, and the like. The digital stamp services 29 can provide requested digital stamps, for example, in the form of a code(s) that the user 105 can write onto the item 117 as delivery fee in lieu of delivery fee stamps. The user account services 31 can maintain user account information and provide requested user-authentication services.

In various implementations, the remote processing system 117 can provide the intelligent collection box 10 with various services for interpreting and responding to questions from the user 110, including a voice detection and authentication service 33, a voice recognition and generation service 35, a language translation service 37, a natural language processing service 39, an artificial intelligence service 41, and/or location, weather, and mapping services 43 (using, e.g., CLOUD SPEECH API™ and CLOUD NATURAL LANGUAGE API by ALPHABET INC. of Mountain View, California, AMAZON AWS by AMAZON.COM, INC. of Seattle, Washington, and API.AI by SPEAKTOIT, INC of Palo Alto, California). The voice detection and authentication service 33 can be a software service that continuously listens for voice triggers and/or authenticate a user's 105 identity based their voice. The voice recognition and generation service 35 can be a software service that transcribes the user's 105 speech into a computer-readable or computer-recognizable form, and generates conversational speech from computer-readable information, e.g., such that the system can "speak" audible answers to questions asked by the user 105. The language translation service 37 can be a software service that translates one language into another language, e.g., a non-English language into U.S. English, which may be the single, base language used by the system 100. The natural language processing service 39 and artificial intelligence service 41 can be a software service that interprets and/or digests words and phrases into a format usable for computer processing. In various implementations, the artificial intelligence service 41 employs machine-learning techniques allowing it to learn and adapt its performance over time. The location, weather, and mapping service 43 is a software service that provides location information (e.g., locations of places, services, and supplies), weather information (e.g., localized weather), and/or mapping information (e.g., maps and directions) in response to appropriate queries or questions from the user 105. The services 33-43 can use libraries particularly adapted to recognize and use delivery service-related words, phrases, locations, and services.

In the embodiment shown, by using the services of the delivery service computing system 15 and the remote processing system 17, the intelligent collection box 10 can respond to almost any delivery service-related question from the user 105. For example, the user 105 can ask the intelligent collection box 10 to provide information related to the following: the collection status of any intelligent collection box 10 or conventional collection box 5 in the system (e.g., "When will this box be collected?" or "When will the next closest collection box be collected?"); the hours of operation for any collection box 5, 10 (e.g., "When is the last collection for this collection box?" or "What is the latest collection time for any collection box within one mile?"); the hours of operation for any post office (e.g., "What time does the nearest post office close today?"); the locations of and/or directions to any collection boxes 5, 10 or post office (e.g., "Give me directions to the nearest uncollected collection box); the retail locations that sell delivery fee stamps or supplies; the current operational information for any post office (e.g., "how busy is the post office on Main street?"); and the like. Additionally, the user 105 can request assistance with mailing or delivery of the item 117. For example, the user can ask for delivery address or destination information (e.g., the postal code of the recipient), delivery fee information (e.g., the delivery fee for delivering the item), and the like. In the case of delivery fee, the intelligent collection box 10 can determine the delivery fee required by asking appropriate questions (e.g., "Is the item you want to send a first class letter?") or directing the user 105 to weigh the item 117 using a scale that is built into the intelligent collection box 10; can charge the delivery fee for the delivery fee to the user 105 (e.g., via an existing postal account of the user 105, or via a user device 110 (e.g., smartphone) payment means); and can provide the user with a delivery fee indicator to place on the item 117, such as a code representing the delivery fee or a stamp.

While many of the examples discussed in this disclosure focus on direct, verbal interaction between the user 105 and the intelligent collection box 10, it is understood that the interactions (verbal or text) can also or alternatively be performed via the user device 110. For example, in various implementations, the user device 110 can be a smartphone, a tablet computer, or the like, and the user 105 can initiate interaction with the intelligent collection box 10 via the application 115 on the user device. The application 115 can use the devices included in a smartphone or tablet (e.g., camera, microphone, speaker, keyboard, and biometric identification devices) to communicate with the user 105, authenticate the user 105, make payment for certain transactions (e.g., buying delivery fee), and complete forms (e.g., hold mail forms).

Figure 3A:
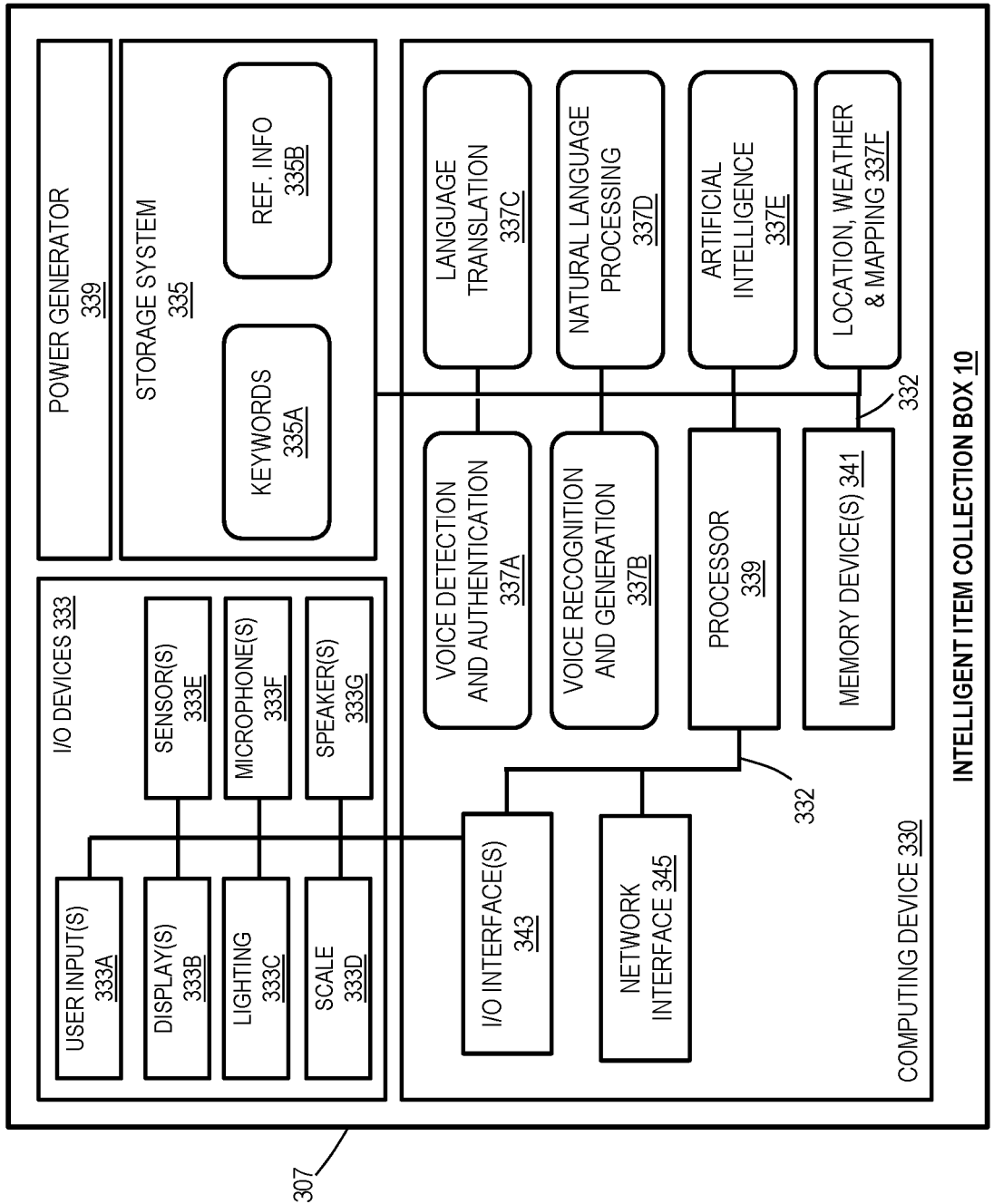
FIG. 3A shows a block diagram illustrating an example of an intelligent collection box in accordance with aspects of the present disclosure.

FIG. 3A shows a system block diagram illustrating an example of an intelligent collection box 10, which can be the same or similar to that described above. The intelligent collection box 10 includes hardware and software that perform the processes and functions disclosed herein. In various implementations, the intelligent collection box 10 includes a housing 307 including a computing device 330, input/output (I/O) devices 333, a storage system 335, and a power generator 339. The housing 307 can be a water-resistant and/or impact casing that encloses the computing device 330, the input/output (I/O) devices 333, the storage system 335, and the power generator 339 to prevent physical and environmental damage. In various implementations, the housing 307 is designed to retrofit existing blue collection boxes of the USPS or those of other delivery services.

The I/O devices 333 can include any sensor, communication or user-input device that enable the computing device 230 to monitor its environment, communication with one or more other computing devices using any type of communications link, interact with a user 105, and interact with the computing device 330. In implementations, the I/O devices 333 can include user-input device(s) 333A (e.g., touch-screen, pointer device, keyboard) a display 333B, lighting 333C (e.g., light-emitting diodes), a weighing scale 333D, sensor(s) 333E (e.g., light, temperature, barometric pressure, proximity, motion, and/or door sensor(s), microphone(s) 333F, and/or speaker(s) 333G.

The storage system 335 can comprise one or more computer-readable, non-volatile hardware storage device that stores information and program instructions. For example, the storage system 235 can be one or more flash drives and/or hard disk drives. In accordance with aspects of the present disclosure, the storage device 335 stores keywords 355A and reference information 355B. In implementations, the keywords 355A can include predefined words used (by, e.g., a voice detection and authentication module 337A) when determining whether to initiate a conversation or interaction with a user (e.g., the user 105). In implementations, the keywords 65 can include predefined words used in a bag-of-words model for natural language processing. The reference information 79 can be one or more databases including, for example, user account information, delivery rate information, location information, box collection information, and other information that can be used by modules 337A-337F, described below.

The power generator 339 can electrically power operation of the intelligent collection box 10. In implementations, the power generator 339 can be a photovoltaic power generation and storage system. For example, the power generation system can include a solar panel (e.g., 65 Watts, not shown) and a battery (e.g., 22,000 m/amp, not shown) to make the intelligent collection box 10 self-sufficient and standalone such that it does not require use any external electrical power source. In various implementations, the solar panel can be integrated with a surface of the weighing scale 333D.

In embodiments, the computing device 333 includes a processor 339 (e.g., microprocessor, microchip, or application-specific integrated circuit), one or more memory devices 341 (e.g., RAM and ROM), one or more I/O interfaces 343, and one or more network interfaces 345. For example, the processor 339 can be a LINUX-based microcontroller and the network interface 345 can be a wireless telephone network modem, such as an LTE modem. The memory device 341 can include a local memory (e.g., a random access memory and a cache memory) employed during execution of program instructions. Additionally, the computing device 330 includes at least one communication channel 332 (e.g., a data bus) by which it communicates with the I/O devices 333 and the storage system 335.

The processor 339 executes computer program instructions (e.g., an operating system and/or application programs or module), which can be stored in the memory device 341 and/or the storage system 335. The processor 339 can also execute the computer program instructions of a voice detection and authentication module 337A, a voice recognition and generation module 337B, a language translation module 337C, a natural language processing module 337D, an artificial intelligence module 337E, and/or a location, weather, and mapping module 337F. In some implementations, the modules 337A-337F can be applications, subprograms, procedures, or the like, that communicate and interact with the application program interfaces (i.e., APIs) for one or more voice detection and authentication services, voice recognition and generation services, language translation services, natural language processing services, artificial intelligence services, and/or location, weather, and mapping services provided as SAAS by remote processing systems, for example as previously describe herein (e.g., the voice detection and authentication service 33, the voice recognition and generation service 35, the language translation service 37, the natural language processing service 39, the artificial intelligence service 41, and/or the location, weather, and mapping service 43 provided by the one or more remote processing systems 17). In other implementations, some or all of the program code for the functionality of modules 337A-337F is locally stored and executed by the intelligent collection box 10. In such implementations, communication and interaction with the remote services 33-43 is not used, as the functionality of the services 33-43 is embodied locally in the modules 337A-337F.

It is noted that the computing device 330 can comprise any general-purpose computing article of manufacture capable of executing computer program instructions installed thereon (e.g., a personal computer, server, etc.). However, the computing device 330 is only representative of various possible equivalent-computing devices that can perform the processes described herein. To this extent, in embodiments, the functionality provided by the computing device 330 can be any combination of general and/or specific purpose hardware and/or computer program instructions. In each embodiment, the program instructions and hardware can be created using standard programming and engineering techniques, respectively.

Figure 3B:
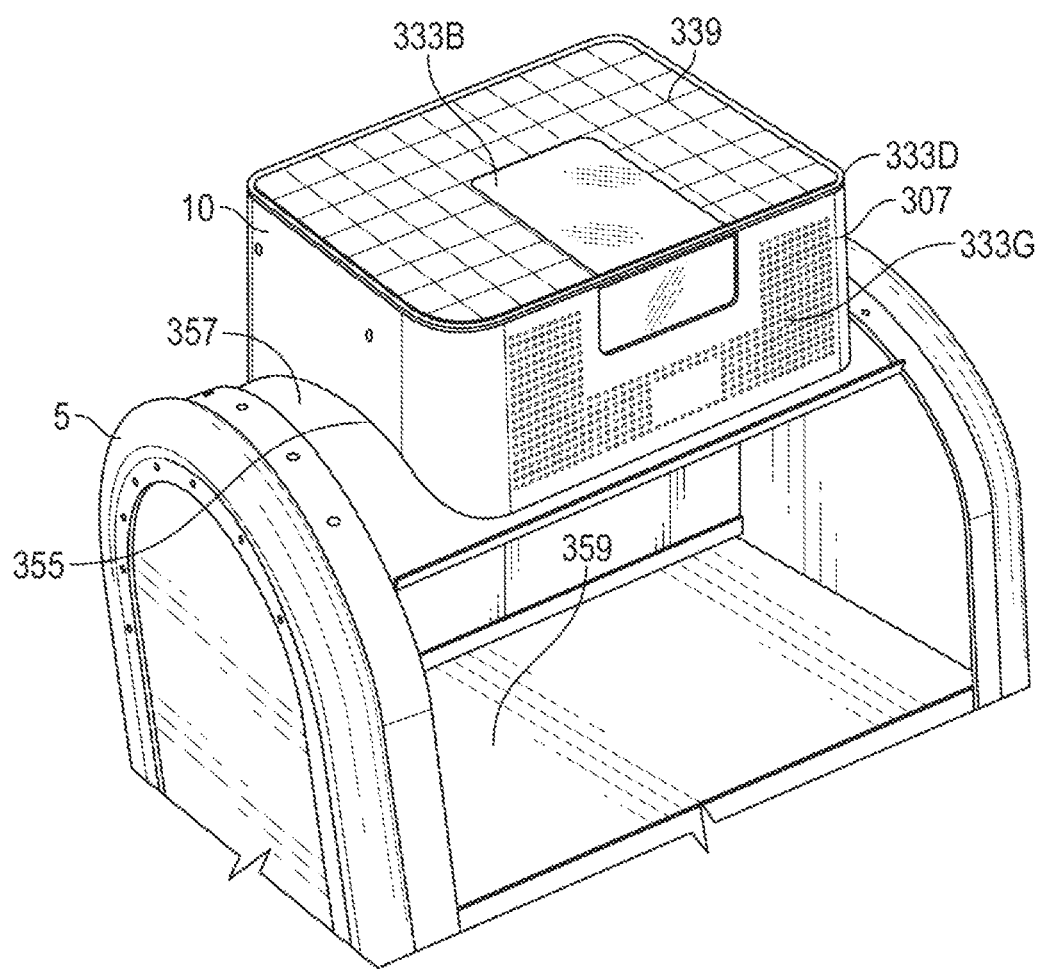
FIG. 3B shows a perspective view of an example of an intelligent collection box in accordance with aspects of the present disclosure.

FIG. 3B shows a perspective view of an example of an intelligent collection box 10 in accordance with aspects of the present disclosure. The intelligent collection box 10 can include. among the other components described above, a display 333B, a weighing scale 333D, speaker(s) 333G, and power generator 339, which can be the same as those previously described. The collection box 5 can include an item receptacle 359 (e.g., a letter slot). Additionally, in accordance with aspects of the present disclosure, the intelligent collection box 10 is shown retrofitted on an existing collection box 5 (e.g., a USPS blue collection box). As illustrated in FIG. 3B, the enclosure 307 of the intelligent collection box 10 is shaped with a curved profile corresponding to a curved upper surface 357 of the collection box 5.

Figure 3C:
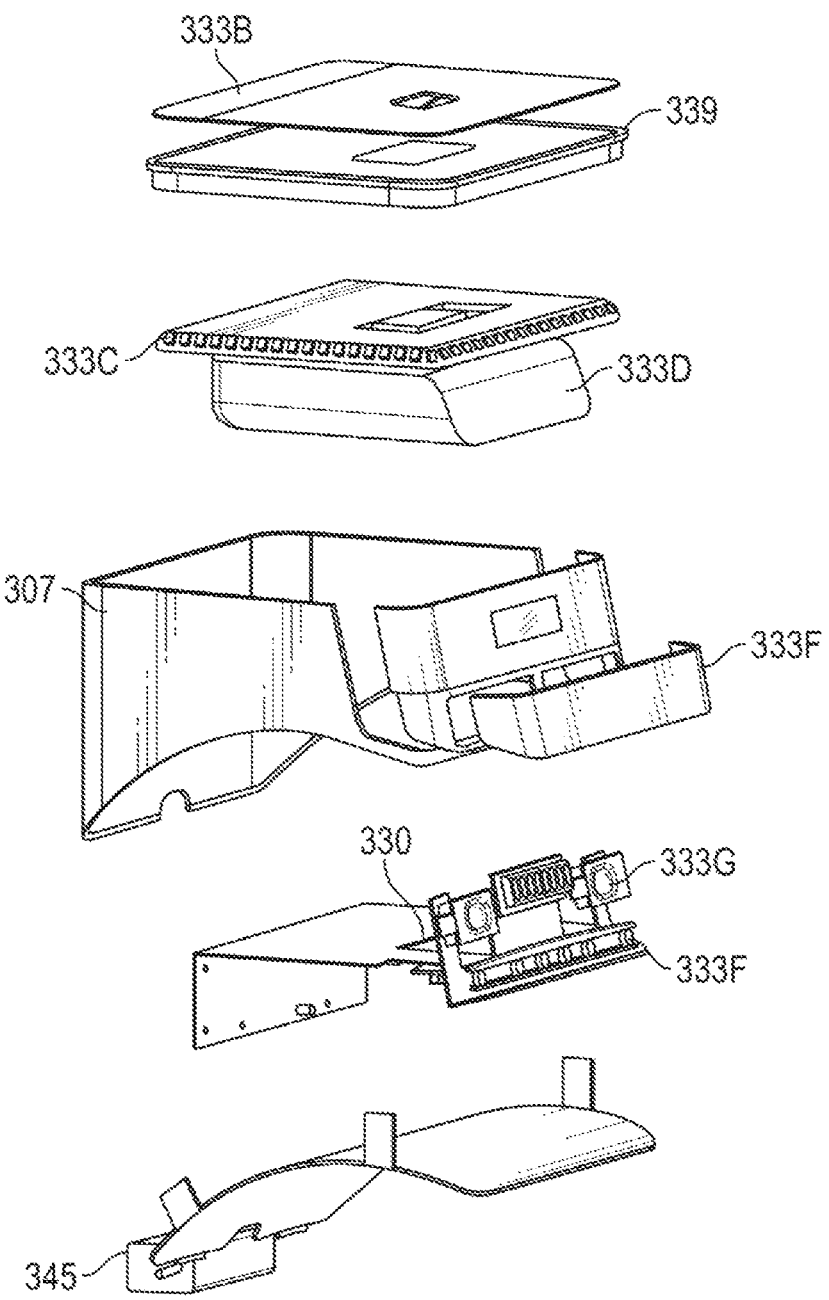
FIG. 3C shows an exploded side view of an example of an intelligent collection box in accordance with aspects of the present disclosure.

FIG. 3C shows an exploded side view of an example of an intelligent collection box 10 in accordance with aspects of the present disclosure. The intelligent collection box 10 can include the housing 307, the computing device 330, the display 333B, the weighing scale 333D, the microphone(s) 333F, the speaker(s) 333G, the power generator 339, and the network interface device 345, as previously described herein. While not shown in FIG. 3C, the intelligent collection box can also include the user-input device(s) 333A, the lighting 333C, and the sensor(s) 333E, as previously descried herein.

Figure 4:
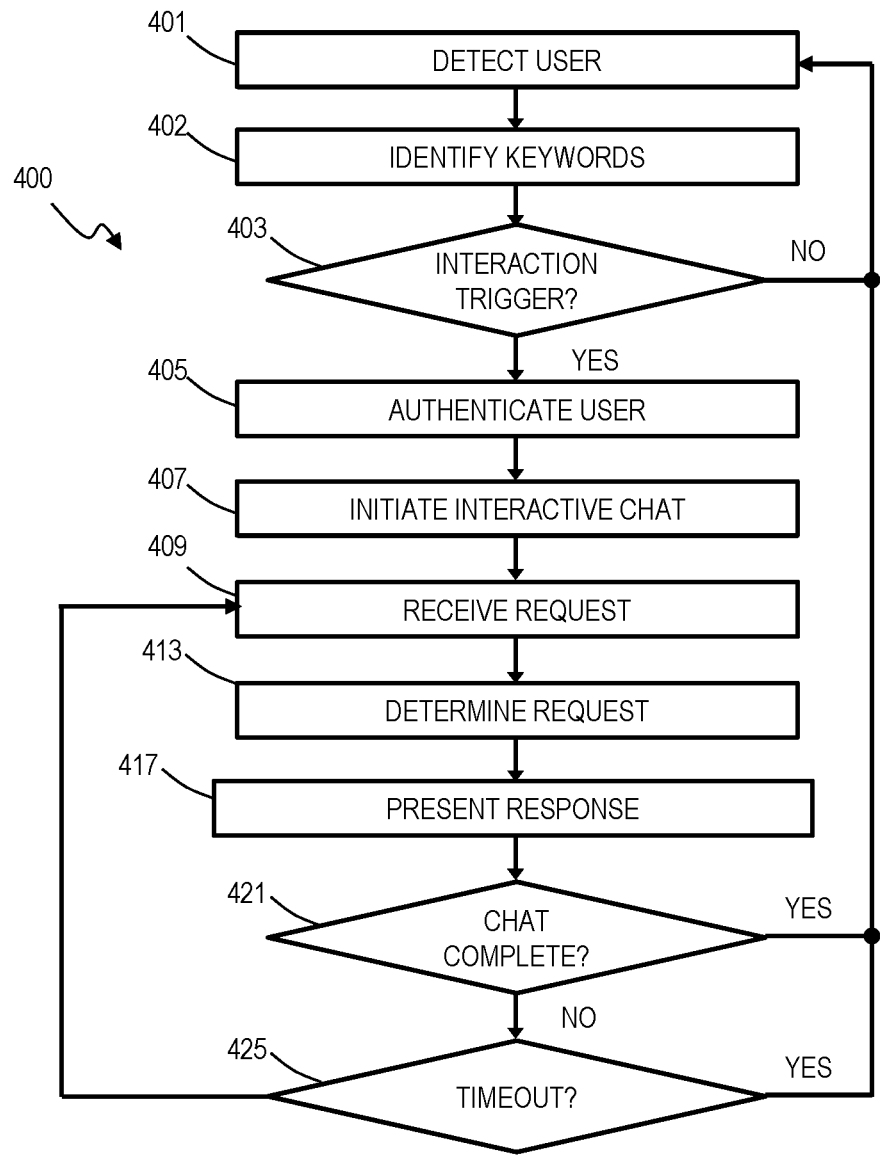
FIG. 4 shows a flow block diagram illustrating an example of a process for an intelligent collection box in accordance with aspects of the present disclosure.
Figure 5:
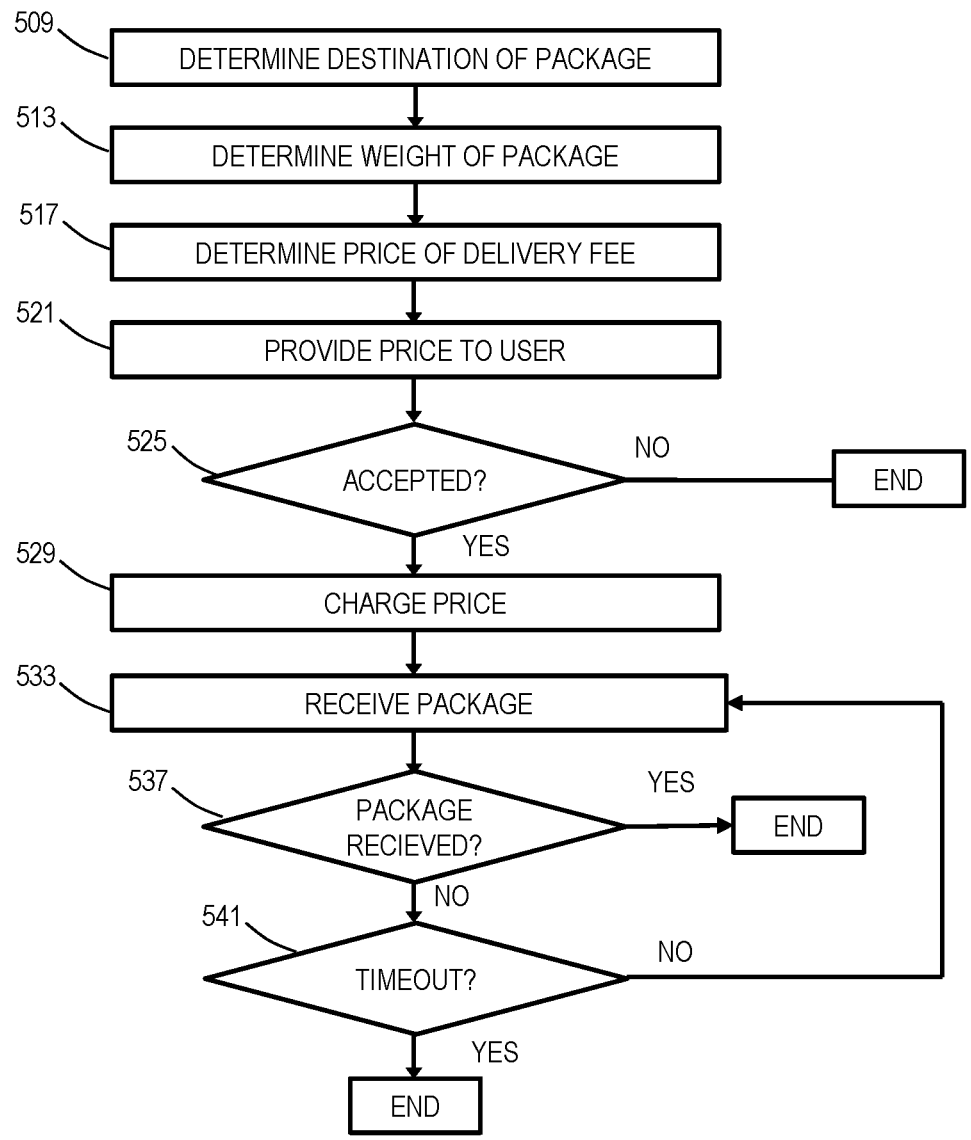
FIG. 5 shows a flow block diagram illustrating an example of a process for an intelligent collection box in accordance with aspects of the present disclosure.

The flow diagrams in FIGS. 4 and 5 illustrate examples of the functionality and operation of possible implementations of systems, methods, and computer program products according to various implementations consistent with the present disclosure. Each block in the flow diagrams of FIGS. 4 and 5 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIGS. 4 and 5. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 4 shows a flow block diagram illustrating an example of a process 400 for an intelligent collection box in accordance with aspects of the present disclosure. At 401, the intelligent collection box (e.g., the intelligent collection box 10) detects a user, (e.g., the user 105). In some implementations, the intelligent collection box detects whether the user and/or a user device (e.g., the user device 110) is within a predefined range of the box using one or more sensors (e.g., a proximity sensor and/or a motion sensor). Additionally or alternatively, the intelligent collection box can listen using a microphone (e.g., microphone 333F) and detect words or phrases (e.g., the keywords 335A) spoken by the user.

At 402, the intelligent collection box identifies one or more keywords spoken by the user detected at 401. For example, the user may speak the keywords "Hello Box." The intelligent collection box can continuously listen for keywords (using, e.g., the microphone 333F and the voice detection and authentication module 337A). The intelligent collection box can, using local or remote language and speech processing services (e.g., services provided by the voice detection and authentication module 337A, the voice recognition and generation module 337B, the language translation module 337C, the natural language processing module 337D, and/or artificial intelligence module 337E) to convert the user's spoken words to text (or to another computer-usable form), translate the spoken keywords, and/ or to interpret the keywords into computer-usable format using natural language processing and artificial intelligence techniques, as are known in the art. For example, the keywords can be identified from spoken words of the user captured by the intelligent collection box by the natural language processing module using a bag-of-words model. Additionally, in some implementations, instead of speaking keywords, can interact with the intelligent collection box via a touchscreen or buttons of the intelligent collection box.

At 403, the intelligent collection box determines whether the keywords identified at 402 are a predefined user interaction trigger. If the intelligent collection box determines that the user did not provide a user interaction trigger (i.e., 403 is "No"), then the process 400 can return to 401. If, on the other hand, the intelligent collection box determines that the user provided a predefined interaction trigger (i.e., 403 is "Yes"), then the process 400 can proceed to 405.

At 405, the intelligent collection box can authenticate the user that supplied the trigger at 403. In some implementations, the intelligent collection box can perform authentication by comparing a user identification key (e.g., password) input by the user to information stored in a pre-established account for that user (e.g., maintained by the delivery service computing system 15). Also, in some implementations, the intelligent collection box can authenticate the user via a user device (e.g., biometric authentication via fingerprint and/or facial recognition that are done by a smartphone), where the identity of the user device is associated with a pre-established account for that user. Further, in some implementations, the intelligent collection box can authenticate using voice authentication, which is also known as speaker recognition or voice recognition (e.g., using TRULYSECURE™ BY SENSORY, INC. of Santa Clara, California). In some embodiments, the voice authentication authenticates the user using the keyword spoken at 403.

At 407, the intelligent collection box can initiate an interactive chat with the user detected at 403. In some implementations, the intelligent collection box only initiates a chat after successful authentication of the user at 405. Initiating the chat can include the intelligent collection box providing an indication that it is ready to receive a request by speaking (e.g., audibly outputting or "speaking" using the speaker 333G) and/or displaying (e.g., visibly outputting using the display 333B) a predefined phrase, such as "Hello. How may I help you?"

At 409, the intelligent collection box can receive a request from the user (e.g., via the microphone 333F and/or the user input 333A), such as the delivery service-related questions previously described above. At 413, the intelligent collection box can interpret the request received at 409. For example, the intelligent collection box can use the voice recognition, the language translation, the natural language processing services, and the artificial intelligence services previously described herein. During 413, the intelligent collection box can chat with the user to obtain user information. For example, using questions determined to the user via the artificial intelligence service, the voice recognition and generation service of the intelligent collection box can ask the user one more follow-up questions to establish a scope of the request that can be answered by the system.

At 421, the intelligent collection box determines whether the chat with the user initiated at 407 is complete. For example, the intelligent collection box may ask the user if there are any more questions. If the chat to be complete at 421 (i.e., 421 is "Yes"), then the process 400 returns to 401 to detect another user. If the chat is not complete at 421 (i.e., 421 is "No"), then at 425 the intelligent collection box determines whether the chat has timed-out without receiving a receiving an input from the user, e.g., by waiting a predetermined amount of time for additional user input, such as waiting 5, 10, 15, 20, 25, or 30 seconds. For example, the user may have walked away from the intelligent collection box and the device may not receive audio or touchscreen input from the user for 30 seconds. If the chat is determined to be timed-out at 425 (i.e., 425 is "Yes"), then the process 400 returns to 401 to detect another user. If the chat is determined not to be timed-out at 425 (i.e., 421 is "No"), then the process 400 can return to 409 and receive, or continue receiving, a new request from the user.

FIG. 5 shows a flow block diagram illustrating an example of a process 500 for an intelligent collection box (e.g., intelligent collection box 10) in accordance with aspects of the present disclosure. In various implementations, the process 500 may be implemented as an expansion or continuation of stages or operations 413 and 417 of FIG. 4, in the particular case where the user request received by the intelligent collection box at 409 is a request to send or mail an item (e.g., the package 117).

As shown in the example of FIG. 5, at 509, the intelligent collection box can determine the destination of the item. In some implementations, for example, using the voice recognition, the language translation, the natural language processing services, and/or the artificial intelligence services previously described herein, the intelligent collection box can audibly (e.g., via speaker 333G) and/or visually (e.g., via display 333B) request the destination for the item, and receive the response of the user (e.g., via the user input device 333A, the display 333B and/or the microphone 333F). In other implementations, the user can input the destination via a user input device of the intelligent collection box (e.g., keyboard and/or a touchscreen display). In other implementations, the user input the destination by selecting the destination from a display of previously used destinations (retrieved from the delivery service computing system 15) and provided on a display of the intelligent collection box for selection by the user. In other implementations, for example, the user can provide the destination to the intelligent collection box from a contact list stored on a user input device (e.g., the user input device 110 using the application 115) using a wired or wireless communication link (e.g. the communication link 25).

At 513, the intelligent collection box can determine the weight of the item using a scale (e.g., weighing scale 333C). For example, using the voice recognition, the language translation, the natural language processing services, and/or the artificial intelligence services previously described herein, the intelligent collection box can audibly (e.g., via speaker 333G) and/or visually (e.g., via display 333B) prompt the user to place the item on a scale (e.g., the scale 333D). At 517, the intelligent collection box can determine a price for a delivery fee (i.e., the shipping charge) for the item based on the weight determined at 513, the destination determined at 509, and one or more predefined table of delivery fee rates (e.g., provided by the delivery service information and/or the digital stamp service 29 of delivery service computing system 15). For example, using the weight determined at 513, the intelligent collection box can determine one or more available delivery service types for delivery of the item and corresponding rates different rates, including, for example, priority delivery, first class delivery, overnight delivery, second day delivery, parcel post delivery, etc.). At 521, the intelligent collection box can provide the user with the price determined at 517 (e.g., by audibly speaking using the speaker 333G and/or visibly outputting using the display 333B). For example, using the voice recognition, the language translation, the natural language processing services, and/or the artificial intelligence services previously described herein, the intelligent collection box can audibly (e.g., via speaker 333G) and/or visually (e.g., via display 333B) indicate or present one or more available delivery service types and corresponding rates determined at 517.

At 525, the intelligent collection box can determine whether the user accepted the price provided at 521. For example, using the voice recognition, the language translation, the natural language processing services, and/or the artificial intelligence services previously described herein, the intelligent collection box can audibly (e.g., via speaker 333G) and/or visually (e.g., via display 333B) prompt the user to input their acceptance of one of the above delivery type and receive the response of the user (e.g., via the user input device 333A, the display 333B and/or the microphone 333F). If the user does not accept the price (i.e. does not agree to pay the delivery fee) (i.e., 525 is "No"), then the process 500 ends. If the user does accept the price provided at 525 (i.e., 525 is "Yes"), then at 529 the intelligent collection box charges the user the price, for example, by charging an existing account of the user (e.g., by charging an account of the user stored in user accounts 31 at the delivery service computing system 15) or by collecting an electronic payment (e.g., by using application 110 executing on user device 110).

At 533, the intelligent collection box can receive the package. In some implementations, the collection box can be a conventional mailbox. Using the voice recognition, the language translation, the natural language processing services, and/or the artificial intelligence services previously described herein, the intelligent collection box can audibly (e.g., via speaker 333G) and/or visually (e.g., via display 333B) prompt the user to deposit the item in the mailbox. In some implementations, the intelligent collection box may automatically unlatch a door to a secure package bin (e.g., collection box 5). At 537, the intelligent collection box can determine whether the package was received by the post collection box. In some implementations, using the voice recognition, the language translation, the natural language processing services, and/or the artificial intelligence services previously described herein, the intelligent collection box can audibly (e.g., via speaker 333G) and/or visually (e.g., via display 333B) prompt the user to confirm that the item was deposited at 533 and receive the response of the user (e.g., via the user input device 333A, the display 333B and/or the microphone 333F). Additionally or alternatively, in some implementations, the intelligent collection box can use one or more sensors (e.g. the sensors 333E), which may be positioned in or around the opening of a collection box (e.g., collection box 5) and detect when the item passes into the collection box, after the door is unlatched. If the item was received (i.e., 537, "Yes"), then the process 500 ends with regard to FIG. 5, and can continue, e.g., as shown in FIG. 4 at 421. If the item was not received (i.e., 537 is "No"), then at 541 the intelligent collection box determines whether the process 500 has timed-out without ever receiving the item from the user. For example, the user may have chosen not to deposit the item and walked away from the intelligent collection box. If the process 500 determines that a time-out has occurred at 541 (i.e., 541 is "Yes"), then the process 500 ends and can await interaction with another user (e.g., FIG. 4, 401, 403). If the process 500 determines that a time-out has not occurred at 541 (i.e., 541 is "No"), for example, because the user has provided a new input, then the process 500 can return to, in this example, 533 and await for receipt of the item from the user.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. An intelligent collection box for a delivery service comprising:
    a processor;
    a computer-readable data storage system, operably connected to the processor, that stores program instructions;
    a weighing scale operably connected to the processor, the weighing scale being physically coupled with the intelligent collection box;
    a display operably connected to the processor;
    a speaker operably connected to the processor;
    a microphone operably connected to the processor;
    a network interface operably connected to the processor;
    an input device comprising one or more of a touchscreen, a keyboard, and a pointer device, the input device being physically integrated with the intelligent collection box; and
    a power generator configured to supply electrical power used by the intelligent collection box;

wherein the program instructions, when executed by the processor, cause the intelligent collection box to perform operations comprising:
identifying one or more spoken keywords spoken by a user using the microphone;
determining that at least one of the one or more spoken keywords match a predefined user interaction trigger;
authenticating the user based on the at least one of the one or more spoken keywords;
triggering an audible interaction session between the user and the intelligent collection box based on the determining that the at least one of the one or more spoken keywords match the predefined user interaction trigger, wherein the interaction session comprises an interactive audible dialogue between the user and the intelligent collection box;
determining an audible request from the user;
presenting a response from among a plurality of responses based on said determined audible request, wherein said audible request is a request for delivery of an item and said response is an audible response to the request for delivery using the speaker;
determining a weight of the item, using the weighing scale;
determining delivery options for the item using the weight and using delivery information obtained via the network interface;
determining a delivery fee for the item using the weighing scale;
providing a delivery fee indicator representing the delivery fee to the user; and
determining that the item has been received by a delivery service collection box after the item is deposited in the delivery service collection box by the user;
wherein the intelligent collection box is mounted atop a curved upper surface of the delivery service collection box, the intelligent collection box being shaped with a curved profile corresponding to the curved upper surface of the delivery service collection box, the intelligent collection box receives user input via the input device, and the intelligent collection box and the delivery service collection box are both accessible to a user having a height in the range of 4.5-7.0 feet.

2. A collection box system for delivery items, the collection box system comprising:
a delivery service collection box; and
an intelligent collection box comprising:
a processor;
a computer-readable data storage device, operably connected to the processor, that stores program instructions;
a speaker operably connected to the processor;
a microphone operably connected to the processor;
a weighing scale physically coupled with the intelligent collection box; and
a network interface operably connected to the processor;
an input device comprising one or more of a touchscreen, a keyboard, and a pointer device, the input device being physically integrated with the intelligent collection box device;
wherein the program instructions, when executed by the processor, cause the intelligent collection box to perform operations comprising:
detecting a user;
identifying one or more spoken keywords spoken by the user;
determining that the one or more spoken keywords match a predefined user interaction trigger;
triggering an audible interaction session between the user and the intelligent collection box based on the determining that the one or more spoken keywords match the predefined user interaction trigger, wherein the interaction session comprises an interactive audible dialogue between the user and the intelligent collection box;
determining an audible request from the user;
presenting, to the user, an audible response from among a plurality of audible responses based on said determined audible request, wherein said audible request is a request for delivery of an item and said audible response is an audible response to the request via the speaker;
interactively repeating the detecting, the identifying, the determining that the one or more spoken keywords match the predefined user interaction trigger, the triggering the interaction session, the determining the audible request related to item delivery from the interaction session, and the presenting;
determining a delivery fee for the item using the weighing scale;
providing a delivery fee indicator representing the delivery fee to the user; and
determining that the item has been received by a delivery service collection box after the item is deposited in the delivery service collection box by the user;
wherein the intelligent collection box is mounted atop a curved upper surface of the delivery service collection box, the intelligent collection box being shaped with a curved profile corresponding to a curved upper surface of the delivery service collection box, the intelligent collection box receiving user input via the input device, the intelligent collection box and the delivery service collection box are both accessible to a user having a height in the range of 4.5-7.0 feet.

3. The collection box system of claim 2, wherein the delivery fee indicator is a delivery fee code for placing on the item.

4. The collection box system of claim 2, wherein the intelligent collection box further comprises an electrical power generator configured to power components of the intelligent collection box.

5. The collection box system of claim 4, wherein the electrical power generator comprises one or more photovoltaic generators.

6. The collection box system of claim 2, wherein the operations further comprise:
authenticating the user using voice authentication.

7. The collection box system of claim 2, wherein identifying the one or more spoken keywords spoken by the user comprises interpreting a spoken request using natural language processing.

8. The collection box system of claim 7, wherein interpreting the spoken request comprises:
determining a language of the spoken request; and
translating the language of the spoken request into a different language.

9. The collection box system of claim 2, wherein the operations further comprise sending documents to a device of the user.

10. The collection box system of claim 2, wherein the intelligent collection box is retrofitted to the collection box.

11. A method comprising:
   detecting, by an intelligent collection box, a user using one or more sensors;
   identifying, by the intelligent collection box using a microphone, one or more spoken keywords spoken by the user;
   determining, by the intelligent collection box using a processor, that the one or more spoken keywords match a predefined user interaction trigger;
   triggering, by the intelligent collection box an audible interaction session between the user and the intelligent collection box based on the determining that the one or more spoken keywords match the predefined user interaction trigger, wherein the interaction session comprises an interactive audible dialogue between the user and the intelligent collection box;
   receiving, by the intelligent collection box using an input device, an audible request, the input device including at least a microphone, one or more of a touchscreen, a keyboard, and a pointer device, the input device being physically integrated with the intelligent collection box;
   presenting to the user, by the intelligent collection box using an output device, an audible response from among a plurality of audible responses based on said received audible request, wherein said audible request is a request related to item delivery and said audible response is an audible response to the request;
   interactively repeating, by the intelligent collection box using the processor, the input device, and the output device, the receiving, and the presenting;
   determining a delivery fee for the item using a weighing scale;
   providing a delivery fee indicator representing the delivery fee to the user; and
   determining that the item has been received by a delivery service collection box after the item is deposited in the delivery service collection box by the user;
   wherein the intelligent collection box comprises the weighing scale, the weighing scale being physically coupled with the intelligent collection box; and
   wherein the intelligent collection box is mounted atop a curved upper surface of a delivery service collection box, the intelligent collection box being shaped with a curved profile corresponding to the curved upper surface of the delivery service collection box, the intelligent collection box receives user input via the input device, the intelligent collection box and the delivery service collection box are both accessible to a user having a height in the range of 4.5-7.0 feet.

12. The method of claim 11, wherein detecting the user comprises detecting an utterance by the user.

13. The method of claim 11, wherein detecting the user comprises detecting that the user is within a predetermined range of the intelligent collection box.

14. The method of claim 11, wherein identifying, by the intelligent collection box, the one or more spoken keywords spoken by the user comprises translating the one or more spoken keywords into computer-usable format using a language and speech processing service.

15. The method of claim 14, wherein identifying the one or more spoken keywords comprises identifying the spoken keywords using a bag-of-words model.

16. The method of claim 11, further comprising authenticating the user using voice authentication.

17. The method of claim 11, wherein the identifying, the determining, and the presenting are entirely spoken.

18. The method of claim 17, further comprising:
   determining a language of the one or more spoken keywords; and
   translating the language of the one or more spoken keywords into a different language.

19. The intelligent collection box of claim 1, wherein the delivery fee indicator is a delivery fee code for placing on the item.

20. The method of claim 11, wherein the delivery fee indicator is a delivery fee code for placing on the item.

\* \* \* \* \*